Patented June 14, 1949

2,473,326

UNITED STATES PATENT OFFICE 2,473,326

COMPOSITION SUITABLE FOR THE CONSTRUCTION OF ROADS, PATHS, FLOORS, AIRDROME RUNWAYS, AND THE LIKE

John Frederick Thomas Blott, Worcester Park, England, assignor to Shell Development Company, San Francisco, Calif., a corporation of Delaware No Drawing. Application July 3, 1944, Serial No. 543,420. In Great Britain June 18, 1943

Section 1, Public Law 690, August 8, 1946
Patent expires June 18, 1963

8 Claims. (Cl. 260—38)

This invention relates to compositions suitable for the construction of roads, paths, floors, aerodrome runways and the like, and for the manufacture of blocks, slabs, bricks and the like suitable for use in the construction of roads, paths, floors, aerodrome runways and the like.

It is well known that partly polymerised thermosetting synthetic resins can be used as bonding agents in processes for the preparation of rigid moulded articles from dry (free from water), mineral and organic fillers such as pigments, clays, wood flour, etc. In such processes a mixture of synthetic resin and filler is compressed in a heated mould. Heating is continued until a sufficient degree of setting has been reached. With thermoplastic synthetic resins similar mixtures are compressed in heated moulds, after which the moulds are cooled until the resin sets. In compositions of this type, the proportion of resin present is of the order of 50% by weight.

It has also been proposed to manufacture a composition consisting of sand, a pigment and a synthetic resin which cures or polymerises on exposure to air.

According to the present invention a composition suitable for the aforesaid purposes is provided comprising sand, clay, or a naturally occurring soil or mixture of soils containing sand and clay, with or without the addition of stone chippings, a water soluble phenol, formaldehyde and water, the phenol and formaldehyde being present in a minor proportion, preferably 5% or less calculated on the weight of the whole composition.

Instead of formaldehyde, per se, there may be used formaldehyde-acting substances such as formaldehyde-yielding polymers of formaldehyde, e. g., paraformaldehyde.

The composition may contain a catalyst promoting the condensation of the water soluble phenol and the formaldehyde in situ and may also contain other ingredients such as pigments.

The water in the composition may be provided by the water naturally present in the other materials used, or water may be added.

Synthetic resin is formed in the compositions of the present invention when they are allowed to remain without being subjected to heat or pressure for a few hours. The synthetic resin formed permeates the whole mass, conferring rigidity thereon and rendering it water repellent to a high degree.

The invention is particularly applicable to the binding of soils to a condition of rigidity by treating the soil at its natural water content with a water-soluble phenol and formaldehyde.

The preferred water-soluble phenols are dihydric or polyhydric phenols or substances containing the same, including crude products such as tars and creosotes obtained in the low temperature carbonisation of coal, wood tars and the like, which contain considerable proportions of dihydric and trihydric phenols, or a mixture of an essentially hydrocarbon oil containing a suitable proportion of dihydric or trihydric phenols may be used in place of an aqueous solution of a phenol, being incorporated in the soil, sand or the like, which is then treated with an aqueous solution of formaldehyde. The setting of such treated soil or like mixtures can be accelerated by the addition of 2% by weight of hydrated lime (calcium hydroxide) to the original soil or the like. It will be understood, however, that pure or substantially pure water-soluble phenols such as resorcinol or pyrogallol may be used.

The following example illustrates how the process of the invention may be carried into effect:

100 parts by weight of a natural soil consisting of sand, silt and clay (40% by weight passing 200 mesh B. S. S. sieve) containing 6 parts by weight of water was thoroughly mixed with an aqueous solution consisting of 5 parts by weight of water, 3 parts by weight of resorcinol and 3 parts by weight of formalin solution (40% formaldehyde). This mixture was then consolidated and stored in a water-saturated atmosphere at room temperature. Within a period of 3 days, the material set to a hard, water repellent mass and on subsequent immersion in water for 2 months, the mass retained its rigid character. With lower amounts of resorcinol (e. g. 1 part by weight) and a correspondingly reduced amount of formalin, similar results were obtained, although the mass was somewhat less hard. In both cases the setting of the soil mixtures took place more quickly when 2% by weight of hydrated lime was added to the original soil.

Practically identical results were obtained when pyrogallol was used in place of resorcinol in the above example.

I claim:

1. A method of producing a substantially water-repellent structural material possessing substantial rigidity, which comprises intimately mixing a major proportion of a natural soil containing clay and sand in combined major proportions therein with combined minor proportions of resorcinol, formaldehyde, water and hydrated lime, the resorcinol and the formaldehyde being used in proportions each less than 5% by weight of the resulting mixture, the hydrated lime being less than 2% by weight of the resulting mixture, and aging the resulting mixture to produce a water-repellent, substantially rigid, structural material.

2. A method of producing a substantially water-repellent structural material possessing substantial rigidity, which comprises intimately mixing a natural soil containing clay and sand with resorcinol, formaldehyde and water, the resorcinol and the formaldehyde being in proportions each less than 5% by weight of the resulting mixture, and aging the resulting mixture to produce a water-repellent, substantially rigid, structural material.

3. A method of producing a substantially water-repellent structural material possessing substantial rigidity, which comprises intimately mixing a natural soil containing clay and sand with a water soluble polyhydric phenol, formaldehyde and water, and thereby dispersing a minor amount, less than 5% by weight each of said phenol and of said formaldehyde based on the resulting mixture, of the phenol and the formaldehyde in the soil, and aging the resulting mixture to produce a water-repellent, substantially rigid, structural material.

4. A method of producing a structural material of substantial rigidity and water-repellency which comprises intimately mixing soil at about its natural water content with a water-soluble polyhydric phenol and formaldehyde-acting substance selected from the group consisting of formaldehyde and formaldehyde-yielding polymers of formaldehyde, to disperse a minor amount, less than 5% by weight of the total resulting mixture, each of said phenol and said formaldehyde-acting substance in the soil.

5. A method of producing a structural material of substantial rigidity and water repellency which comprises intimately mixing clay and sand in combined major proportions with combined minor proportions of water, a water-soluble polyhydric phenol, and a formaldehyde-acting substance selected from the group consisting of formaldehyde and formaldehyde-yielding polymers of formaldehyde, the phenol and the formaldehyde-acting substance each constituting not more than 5% by weight of the resulting mixture, and aging the resulting mixture to produce a water-repellent, substantially rigid structural material.

6. A substantially water-repellent structural material possessing substantial rigidity consisting essentially of an intimate mixture of major amounts of clay and sand having dispersed intimately therethrough minor amounts of water, hydrated lime, and a resin formed from resorcinol and formaldehyde, said hydrated lime being present in an amount less than 2 per cent by weight of the mixture and said resin being present in an amount less than 10 per cent by weight of the mixture, said mixture being a water-repellent, substantially rigid structural material.

7. A substantially water-repellent structural material possessing substantial rigidity comprising a mixture of combined major proportions of sand and clay having intimately dispersed therethrough minor amounts of water, hydrated lime, and a resinified condensation product of a water soluble polyhydric phenol with a formaldehyde-acting substance of the group consisting of formaldehyde, and formaldehyde-yielding polymers of formaldehyde, said hydrated lime being present in an amount less than 2 per cent by weight of the mixture, said resinified condensation product being present in an amount less than 10 per cent by weight of the mixture, said mixture being a water-repellent, substantially rigid structural material.

8. A substantially water-repellent structural material possessing substantial rigidity comprising a mixture of combined major proportions of clay and sand having dispersed intimately therethrough a minor amount of a resinified condensation product of a water-soluble polyhydric phenol with a formaldehyde-acting substance of the group consisting of formaldehyde and formaldehyde-yielding polymers of formaldehyde, said resinified condensation product being present in an amount less than 10 per cent of the mixture, said mixture being a water-repellent, substantially rigid structural material.

JOHN FREDERICK THOMAS BLOTT.

REFERENCES CITED

The following references are of record in the file of this patent:

UNITED STATES PATENTS

| Number | Name | Date |
| --- | --- | --- |
| 1,054,265 | Backeland | Feb. 25, 1913 |
| 1,147,264 | Peter | July 20, 1915 |
| 2,243,369 | Albert | May 27, 1941 |
| 2,288,047 | Sullivan et al. | June 30, 1942 |